Dec. 9, 1930.                    A. C. HAYDEN                    1,784,097
                            MOTION PICTURE PROJECTOR
                       Filed June 11, 1928          2 Sheets-Sheet 1
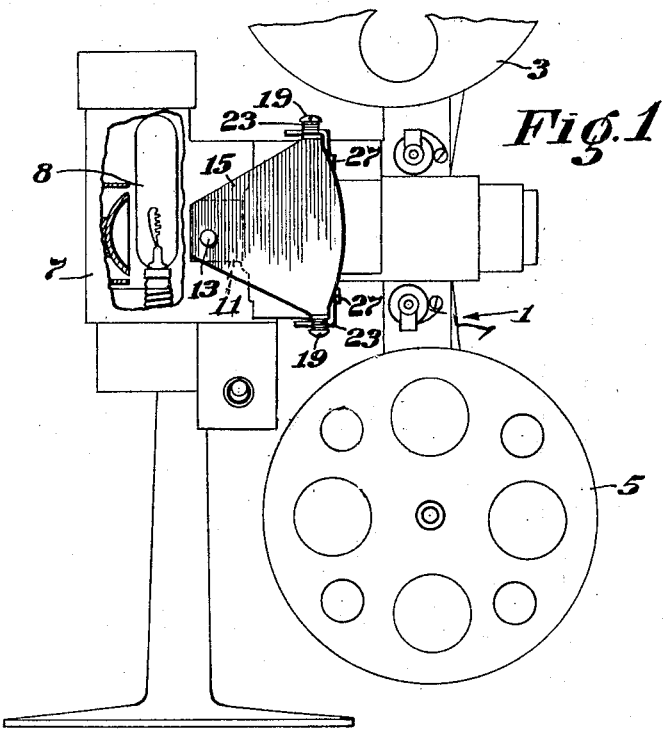
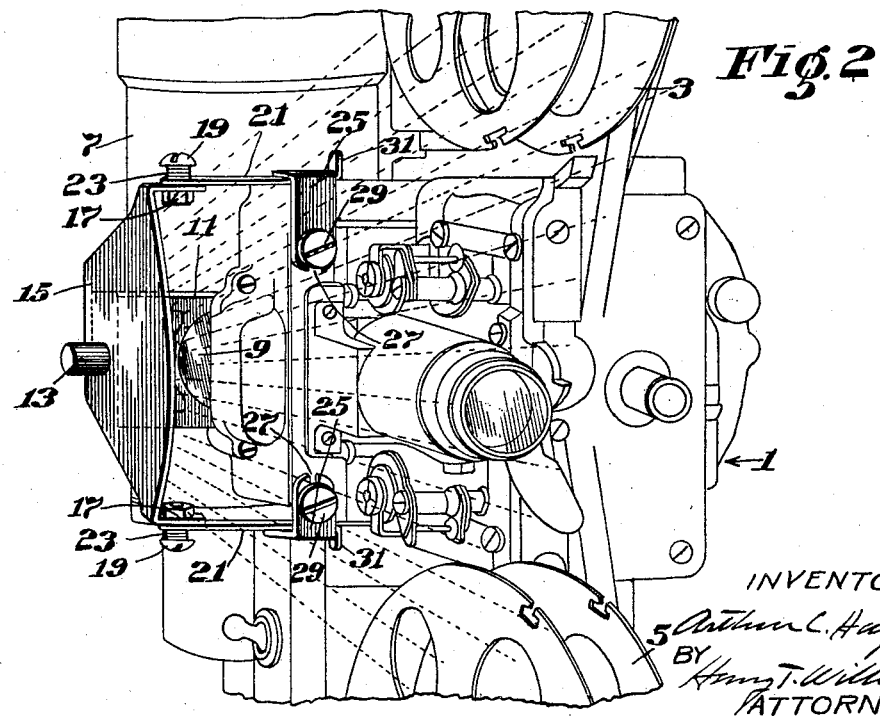

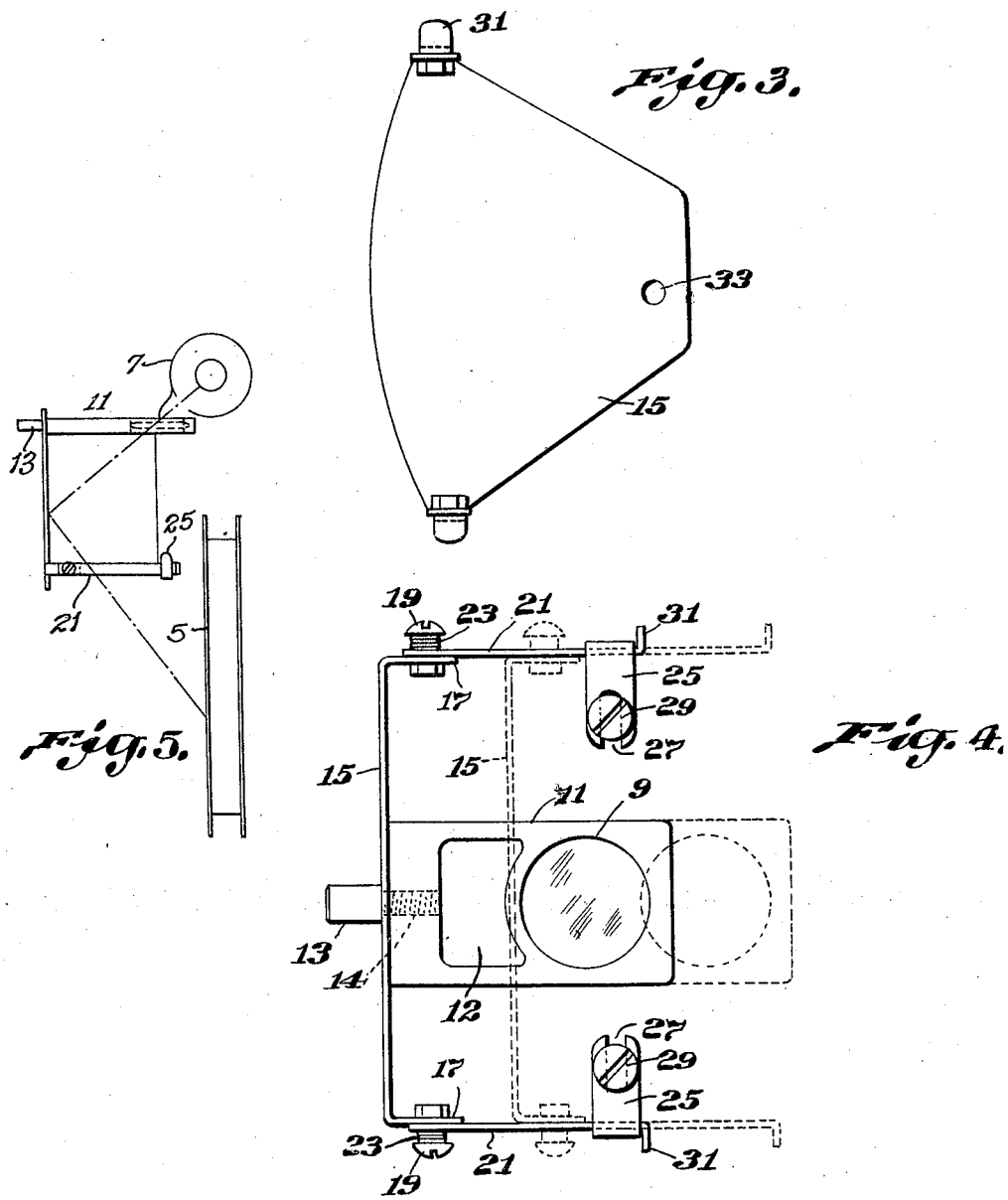

Patented Dec. 9, 1930

1,784,097

UNITED STATES PATENT OFFICE

ARTHUR C. HAYDEN, OF BROCKTON, MASSACHUSETTS

MOTION-PICTURE PROJECTOR

Application filed June 11, 1928. Serial No. 284,291.

The invention to be hereinafter described relates to motion picture projectors.

In the use of a motion picture projector, it is customary for the operator on conclusion of each picture to remove the reel on which the film is wound and to introduce to the projector the reel carrying the film for the next picture to be shown. Also, it is necessary to thread the film from the let-off reel through the projector to the take-up reel, and to attach the free end of the film thereto.

Heretofore a small electric lamp has been provided adjacent to the projector to furnish enough light to enable the operator to perform the above operations. A purpose of the present invention is to eliminate the necessity for this extra electric lamp, and to accomplish this, the usual electric lamp in the projector lamp house is utilized.

The character of the invention will be best understood by reference to the following description of one good form thereof shown in the accompanying drawing, wherein:

Fig. 1 is a perspective view of a portion of a motion picture projector showing the relation of the reflector, condenser lens and lamp;

Fig. 2 is a perspective view of the projector;

Fig. 3 is a side view of the reflector;

Fig. 4 is an end view of the reflector and a side view of the condenser lens and its carrier; and Fig. 5 is a diagram showing the path of the light passing from the lamp through the condenser lens to the reflector and thence to the reel.

Referring to the drawing, 1 (Figs. 1 and 2) designates a usual motion picture projector provided with reels 3 and 5. At the rear end of the projector is a cylindrical house 7 containing the usual electric lamp 8 for illuminating the screen and projecting the pictures.

In front of the lamp is the condenser lens 9 carried by a slide 11 provided with an opening 12 and a knurled handle 13 having a screw 14 threaded to the slide. When the slide and reflector are adjusted inward to their positions shown in dotted lines in Fig. 4, they are in line with the usual electric lamp and lenses, and ready for projecting pictures. The slide may be taken out to permit the lens to be cleaned from time to time. When the slide and reflector are pulled outward to their positions shown in full lines in Fig. 4, the condenser lens will extend slightly beyond the side of the projector and be in a position to allow lights to emerge from the electric lamp in the house 7, through the lens and laterally out from the projector.

To reflect and direct the light to the reels and to other external parts of the projector, the reflector 15 is provided, in the present instance, in the form of a segmental plate having its inner face nickel plated and its outer face lacquered. Projecting inward from the upper and lower edges of the plate are a pair of ears 17 connected by bolts 19 with a pair of links 21. The links are frictionally pressed against the ears by coil springs 23 encircling the bolts. The inner ends of the links extend beneath arms of L-shaped brackets 25 having open-ended slots 27 which can be slid onto shanks of screws 29 and beneath their heads, said screws being on a usual projector. To limit outward adjustment of the slide and reflector the links have out-turned ends 31 adapted to engage edges of the brackets. The reflector plate has a hole 33 therein adapted to receive the screw 14 of the handle 13, referred to, on the condenser lens carrying slide.

In applying the reflector to the projector, it is merely necessary to unscrew the handle 13 from the slide, and insert the screw 14 through the plate hole 33 and into the slide. The plate will be confined between the handle and slide. Then the screws 29 are unscrewed sufficiently to allow the slotted ends of brackets 25 to be slipped beneath the heads of said screws, which are then tightened to hold the brackets.

When it is desired to project pictures, the slide and reflector plate are slid inward, and in making this adjustment the links 21 will slide inward under the brackets 25. When the operator desires to obtain sufficient light to thread a new film from one reel through the projector and to the other reel, he grasps the handle 13 and pulls the slide and reflector outward to their positions shown in Fig. 2. Then some of the light from the electric lamp in the house 7 will emerge laterally through the condenser lens and be reflected so as to throw light on the parts which should be illuminated as indicated in Figs. 2 and 5.

After the brackets have been attached to the projector they may remain thereon. When it is desired to remove the reflector from the projector, the links 21 are swung on bolts 19 out from under brackets 25, and handle 13 is unscrewed, thereby permitting the reflector to be removed from the slide.

This reflector device is simple and cheap in construction, and can be applied to a usual projector without altering it. By use of this reflector and utilization of the electric lamp in the projector, not only is sufficient light obtained for the purposes, but also the operator is relieved from the necessity of providing an extra electric lamp outside of the projector, and from making the electrical connections heretofore necessary for the extra lamp.

It will be understood that the invention is not limited to the specific embodiment shown, and that various deviations may be made therefrom without departing from the spirit and scope of the appended claims.

What is claimed is:

1. A motion picture projector comprising, in combination, an electric lamp, a condenser lens, a slide for the lens, and a reflector connected to the slide for deflecting light emerging from the lamp and through the condenser lens when the slide and reflector are pulled outwardly partially to expose the lens externally of the projector.

2. A motion picture projector comprising, in combination, a casing, an electric lamp, condenser lens, and a slide for the lens in said casing, and a reflector located externally of the casing for deflecting light emerging from the lamp and through the condenser lens, to external parts of the projector.

3. A motion picture projector comprising, in combination, an electric lamp, a condenser lens, a slide for the lens, a reflector connected to the slide, brackets on the projector, and links pivotally connected to the reflector and guided by said brackets.

4. A motion picture projector comprising, in combination, a casing, an electric lamp, condenser lens, and a slide for the lens mounted in the casing, a pair of brackets mounted on the casing, a reflector, means connecting the reflector with the slide, and links connecting the reflector with said brackets, said reflector being adapted to move in and out with said slide, and said links being adapted to move in and out in said brackets.

5. A motion picture projector comprising, in combination, a casing, an electric lamp, condenser lens, and a slide for the lens in said casing, a reflector connected to the slide for deflecting light emerging from the lamp through the condenser lens, and means for limiting outward adjustment of the slide and reflector.

6. A motion picture projector comprising, in combination, a casing, an electric lamp, condenser lens and slide in the casing, a pair of brackets secured to the casing, a reflector, means connecting the reflector with the slide, and a pair of links pivotally connected to the reflector and adapted to be swung away from the brackets in removing the reflector from the casing.

7. A reflector device for external application to a motion picture projector to deflect light emerging from the lamp within the projector and, through the condenser lens, to external parts of the projector, comprising a reflector adapted for connection with the condenser lens slide, a pair of links pivotally connected to the reflector, and a pair of brackets for guiding said links and having provision for connection with the projector.

8. A reflector device for attachment to a motion picture projector comprising a reflector plate having ears projecting therefrom, bolts entered through said ears, links pivotally mounted on said bolts, coil springs encircling the bolts for pressing the links against the ears, and brackets for guiding the links and adapted to be secured to the projector.

ARTHUR C. HAYDEN.